United States Patent

Brennecke

(10) Patent No.: US 7,695,040 B2
(45) Date of Patent: Apr. 13, 2010

(54) STRUCTURAL REINFORCEMENT MEMBER AND METHOD OF USE THEREFOR

(75) Inventor: Eric Brennecke, Troy, MI (US)

(73) Assignee: Zephyros, Inc., Romeo, MI (US)

( * ) Notice: Subject to any disclaimer, the term of this patent is extended or adjusted under 35 U.S.C. 154(b) by 0 days.

(21) Appl. No.: 12/040,383

(22) Filed: Feb. 29, 2008

(65) Prior Publication Data

US 2008/0143143 A1 Jun. 19, 2008

Related U.S. Application Data (63) Continuation of application No. 11/229,375, filed on Sep. 16, 2005, now Pat. No. 7,374,219.

(60) Provisional application No. 60/612,304, filed on Sep. 22, 2004.

(51) Int. Cl.
*B62D 25/20* (2006.01)

(52) U.S. Cl. ............... 296/30; 296/187.02; 296/204

(58) Field of Classification Search ............ 296/187.02, 296/187.03, 187.05, 187.08, 187.09, 193.06, 296/193.07, 203.01, 204, 205, 29, 30; 293/102, 293/120, 132, 155

See application file for complete search history.

(56) References Cited

U.S. PATENT DOCUMENTS

| | | | |
|---|---|---|---|
| 4,463,870 A | 8/1984 | Coburn, Jr. et al. | |
| 4,610,836 A | 9/1986 | Wycech | |
| 4,751,249 A | 6/1988 | Wycech | |
| 4,769,391 A | 9/1988 | Wycech | |
| 4,813,690 A | 3/1989 | Coburn, Jr. | |
| 4,836,516 A | 6/1989 | Wycech | |
| 4,853,270 A | 8/1989 | Wycech | |
| 4,861,097 A | 8/1989 | Wycech | |
| 4,923,902 A | 5/1990 | Wycech | |
| 4,978,562 A | 12/1990 | Wycech | |
| 5,092,649 A * | 3/1992 | Wurl | 296/103 |
| 5,124,186 A | 6/1992 | Wycech | |
| 5,358,397 A | 10/1994 | Ligon et al. | |
| 5,506,025 A * | 4/1996 | Otto et al. | 428/98 |
| 5,725,272 A | 3/1998 | Jones | |
| 5,727,826 A * | 3/1998 | Frank et al. | 293/102 |
| 5,755,486 A | 5/1998 | Wycech | |
| 5,806,889 A * | 9/1998 | Suzuki et al. | 280/748 |
| 5,888,600 A | 3/1999 | Wycech | |
| 5,985,435 A | 11/1999 | Czaplicki et al. | |
| 5,992,923 A | 11/1999 | Wycech | |
| 6,003,274 A | 12/1999 | Wycech | |
| 6,006,484 A | 12/1999 | Geissbuhler | |

(Continued)

FOREIGN PATENT DOCUMENTS

DE   19812288 C1   2/1998

(Continued)

OTHER PUBLICATIONS

Born et al., Structural Bonding in Automotive Applications.

(Continued)

*Primary Examiner*—Glenn Dayoan
*Assistant Examiner*—Gregory Blankenship
(74) *Attorney, Agent, or Firm*—Dobrusin & Thennisch PC (57) ABSTRACT

There is disclosed a reinforcement member with a carrier member and a reinforcement material disposed on the carrier member.

20 Claims, 3 Drawing Sheets

U.S. PATENT DOCUMENTS

| | | | |
|---|---|---|---|
| 6,033,300 A | 3/2000 | Schneider | |
| 6,068,424 A | 5/2000 | Wycech | |
| 6,079,180 A | 6/2000 | Wycech | |
| 6,092,864 A | 7/2000 | Wycech et al. | |
| 6,096,403 A | 8/2000 | Wycech et al. | |
| 6,099,948 A | 8/2000 | Paver, Jr. | |
| 6,103,341 A | 8/2000 | Barz et al. | |
| 6,131,897 A | 10/2000 | Barz et al. | |
| 6,135,542 A | 10/2000 | Emmelmann et al. | |
| 6,149,227 A | 11/2000 | Wycech | |
| 6,150,428 A | 11/2000 | Hanley, IV et al. | |
| 6,165,588 A | 12/2000 | Wycech | |
| 6,168,226 B1 | 1/2001 | Wycech | |
| 6,189,953 B1 | 2/2001 | Wycech | |
| 6,196,621 B1 | 3/2001 | VanAssche | |
| 6,199,940 B1 | 3/2001 | Hopton et al. | |
| 6,207,244 B1 | 3/2001 | Hesch | |
| 6,233,826 B1 | 5/2001 | Wycech | |
| 6,237,304 B1 | 5/2001 | Wycech | |
| 6,244,601 B1 | 6/2001 | Buchholz et al. | |
| 6,247,287 B1 | 6/2001 | Takabatake | |
| 6,253,524 B1 | 7/2001 | Hopton et al. | |
| 6,263,635 B1 | 7/2001 | Czaplicki | |
| 6,270,600 B1 | 8/2001 | Wycech | |
| 6,272,809 B1 | 8/2001 | Wycech | |
| 6,276,105 B1 | 8/2001 | Wycech | |
| 6,281,260 B1 | 8/2001 | Hanley, IV et al. | |
| 6,287,666 B1 | 9/2001 | Wycech | |
| 6,296,298 B1 | 10/2001 | Barz et al. | |
| 6,305,136 B1 | 10/2001 | Hopton et al. | |
| 6,311,452 B1 | 11/2001 | Barz et al. | |
| 6,315,938 B1 | 11/2001 | Jandali | |
| 6,319,964 B1 | 11/2001 | Blank et al. | |
| 6,321,793 B1 | 11/2001 | Czaplicki et al. | |
| 6,332,731 B1 | 12/2001 | Wycech | |
| 6,341,467 B1 | 1/2002 | Wycech | |
| 6,354,641 B1* | 3/2002 | Schroeder et al. | 293/155 |
| 6,358,584 B1 | 3/2002 | Czaplicki | |
| 6,368,438 B1 | 4/2002 | Chang et al. | |
| 6,372,334 B1 | 4/2002 | Wycech | |
| D457,120 S | 5/2002 | Broccardo et al. | |
| 6,382,635 B1 | 5/2002 | Fitzgerald | |
| 6,383,610 B1 | 5/2002 | Barz et al. | |
| 6,389,775 B1 | 5/2002 | Steiner et al. | |
| 6,406,078 B1 | 6/2002 | Wycech | |
| 6,413,611 B1* | 7/2002 | Roberts et al. | 428/99 |
| 6,419,305 B1* | 7/2002 | Larsen | 296/203.03 |
| 6,422,575 B1 | 7/2002 | Czaplicki et al. | |
| 6,435,601 B2* | 8/2002 | Takahara | 296/187.03 |
| H2047 H | 9/2002 | Harrison et al. | |
| 6,455,146 B1 | 9/2002 | Fitzgerald | |
| 6,467,834 B1 | 10/2002 | Barz et al. | |
| 6,471,285 B1 | 10/2002 | Czaplicki et al. | |
| 6,474,722 B2 | 11/2002 | Barz | |
| 6,474,723 B2 | 11/2002 | Czaplicki et al. | |
| 6,475,577 B1 | 11/2002 | Hopton et al. | |
| 6,478,367 B2 | 11/2002 | Ishikawa | |
| 6,482,486 B1 | 11/2002 | Czaplicki et al. | |
| 6,482,496 B1 | 11/2002 | Wycech | |
| 6,491,336 B1 | 12/2002 | Beckmann et al. | |
| 6,502,821 B2 | 1/2003 | Schneider | |
| 6,519,854 B2 | 2/2003 | Blank | |
| 6,523,857 B1 | 2/2003 | Hopton et al. | |
| 6,523,884 B2 | 2/2003 | Czaplicki et al. | |
| 6,546,693 B2 | 4/2003 | Wycech | |
| 6,550,847 B2 | 4/2003 | Honda et al. | |
| 6,561,571 B1* | 5/2003 | Brennecke | 296/187.02 |
| 6,573,309 B1 | 6/2003 | Reitenbach et al. | |
| 6,575,526 B2 | 6/2003 | Czaplicki et al. | |
| 6,607,238 B2* | 8/2003 | Barz | 296/187.09 |
| 6,619,727 B1 | 9/2003 | Barz et al. | |
| 6,634,698 B2 | 10/2003 | Kleino | |
| 6,641,208 B2 | 11/2003 | Czaplicki et al. | |
| 6,668,457 B1 | 12/2003 | Czaplicki | |
| 6,672,654 B2* | 1/2004 | Yamada et al. | 296/205 |
| 6,691,468 B2 | 2/2004 | Helferty | |
| 6,692,347 B1 | 2/2004 | Schneider | |
| 6,708,979 B2 | 3/2004 | Stratman et al. | |
| 6,729,425 B2* | 5/2004 | Schneider et al. | 180/68.5 |
| 6,748,667 B2 | 6/2004 | Sevastian | |
| 6,777,049 B2 | 8/2004 | Sheldon et al. | |
| 6,786,533 B2 | 9/2004 | Bock et al. | |
| 6,793,274 B2 | 9/2004 | Riley et al. | |
| 6,811,864 B2 | 11/2004 | Czaplicki et al. | |
| 6,817,654 B2 | 11/2004 | Kitagawa et al. | |
| 6,820,923 B1 | 11/2004 | Bock et al. | |
| 6,846,559 B2 | 1/2005 | Czaplicki et al. | |
| 6,851,232 B1 | 2/2005 | Schwegler | |
| 6,855,652 B2 | 2/2005 | Hable et al. | |
| 6,880,657 B2* | 4/2005 | Schneider et al. | 180/68.5 |
| 6,887,914 B2 | 5/2005 | Czaplicki et al. | |
| 6,890,021 B2 | 5/2005 | Bock et al. | |
| 6,905,745 B2 | 6/2005 | Sheldon et al. | |
| 6,920,693 B2 | 7/2005 | Hankins et al. | |
| 6,921,130 B2 | 7/2005 | Barz et al. | |
| 6,923,499 B2 | 8/2005 | Wieber et al. | |
| 6,928,736 B2 | 8/2005 | Czaplicki et al. | |
| 6,932,421 B2 | 8/2005 | Barz | |
| 6,938,947 B2 | 9/2005 | Barz et al. | |
| 6,941,719 B2 | 9/2005 | Busseuil et al. | |
| 6,953,219 B2 | 10/2005 | Lutz et al. | |
| 6,955,593 B2 | 10/2005 | Lewis et al. | |
| 7,025,409 B2 | 4/2006 | Riley et al. | |
| 7,077,460 B2 | 7/2006 | Czaplicki et al. | |
| 7,111,899 B2 | 9/2006 | Gray | |
| 7,114,763 B2* | 10/2006 | Riley et al. | 296/187.03 |
| 7,125,461 B2 | 10/2006 | Czaplicki | |
| 7,160,491 B2 | 1/2007 | Barz | |
| 7,255,388 B2 | 8/2007 | Le Gall | |
| 7,374,219 B2 | 5/2008 | Brennecke | |
| 7,520,561 B2* | 4/2009 | Nakamae et al. | 296/193.09 |
| 2002/0053179 A1 | 5/2002 | Wycech | |
| 2002/0074827 A1 | 6/2002 | Fitgerald et al. | |
| 2002/0096833 A1 | 7/2002 | Czaplicki et al. | |
| 2002/0174954 A1 | 11/2002 | Busseuil et al. | |
| 2003/0001469 A1 | 1/2003 | Hankins et al. | |
| 2003/0039792 A1 | 2/2003 | Hable et al. | |
| 2003/0042056 A1* | 3/2003 | Schneider et al. | 180/68.5 |
| 2003/0050352 A1 | 3/2003 | Guenther et al. | |
| 2003/0057737 A1 | 3/2003 | Bock et al. | |
| 2003/0062739 A1 | 4/2003 | Bock | |
| 2003/0069335 A1 | 4/2003 | Czaplicki et al. | |
| 2003/0140671 A1 | 7/2003 | Lande et al. | |
| 2003/0176128 A1 | 9/2003 | Czaplicki et al. | |
| 2003/0183317 A1 | 10/2003 | Czaplicki et al. | |
| 2003/0184121 A1 | 10/2003 | Czaplicki et al. | |
| 2003/0201572 A1 | 10/2003 | Coon et al. | |
| 2003/0209921 A1 | 11/2003 | Coon et al. | |
| 2003/0218019 A1 | 11/2003 | Le Gall et al. | |
| 2004/0011282 A1 | 1/2004 | Myers et al. | |
| 2004/0018341 A1 | 1/2004 | Richardson et al. | |
| 2004/0018353 A1 | 1/2004 | Czaplicki et al. | |
| 2004/0034982 A1 | 2/2004 | Wieber et al. | |
| 2004/0036317 A1 | 2/2004 | Kleino | |
| 2004/0046423 A1 | 3/2004 | Wieber | |
| 2004/0056472 A1 | 3/2004 | Schneider | |
| 2004/0074150 A1 | 4/2004 | Wycech | |
| 2004/0076831 A1 | 4/2004 | Hable et al. | |
| 2004/0079478 A1 | 4/2004 | Merz | |
| 2004/0084141 A1 | 5/2004 | Czaplicki | |
| 2004/0112531 A1 | 6/2004 | Bogert et al. | |
| 2004/0124553 A1 | 7/2004 | Czaplicki et al. | |
| 2004/0135058 A1 | 7/2004 | Wycech | |
| 2004/0143969 A1 | 7/2004 | Czaplicki | |

| | | | | | | |
|---|---|---|---|---|---|---|
| 2004/0212220 | A1 | 10/2004 | Riley et al. | EP | 1362683 A2 | 11/2003 |
| 2004/0217626 | A1 | 11/2004 | Barz et al. | EP | 1362769 A1 | 11/2003 |
| 2004/0227377 | A1 | 11/2004 | Gray | EP | 1428744 | 6/2004 |
| 2004/0256888 | A1 | 12/2004 | Le Gall et al. | EP | 1475295 A2 | 11/2004 |
| 2004/0262810 | A1 | 12/2004 | Barz et al. | EP | 1591224 A1 | 2/2005 |
| 2004/0262853 | A1 | 12/2004 | Larsen et al. | EP | 1157916 B1 | 10/2005 |
| 2005/0012280 | A1 | 1/2005 | Richardson | EP | 1256512 A2 | 11/2008 |
| 2005/0016807 | A1* | 1/2005 | Braymand ............... 188/371 | FR | 2749263 | 12/1997 |
| 2005/0017543 | A1 | 1/2005 | Riley et al. | GB | 2375328 | 11/2002 |
| 2005/0081383 | A1 | 4/2005 | Kosal et al. | JP | 10053156 | 2/1998 |
| 2005/0082111 | A1 | 4/2005 | Weber | JP | 2001-62833 | 3/2001 |
| 2005/0087899 | A1 | 4/2005 | Coon et al. | JP | 2001-199362 | 7/2001 |
| 2005/0102815 | A1 | 5/2005 | Larsen | JP | 02001191949 A | 7/2001 |
| 2005/0126286 | A1 | 6/2005 | Hable et al. | JP | 2002-362412 | 12/2002 |
| 2005/0127145 | A1 | 6/2005 | Czaplicki et al. | WO | WO 95/32110 | 5/1995 |
| 2005/0159531 | A1 | 7/2005 | Ferng | WO | WO 97/02967 | 1/1997 |
| 2005/0166532 | A1 | 8/2005 | Barz | WO | WO 97/43501 | 11/1997 |
| 2005/0172486 | A1 | 8/2005 | Carlson et al. | WO | WO 98/50221 | 5/1998 |
| 2005/0194706 | A1 | 9/2005 | Kosal et al. | WO | WO 99/08854 | 2/1999 |
| 2005/0212326 | A1 | 9/2005 | Marion | WO | WO 99/28575 | 6/1999 |
| 2005/0212332 | A1* | 9/2005 | Sheldon et al. ........ 296/203.01 | WO | WO 99/48746 | 9/1999 |
| 2005/0217785 | A1 | 10/2005 | Hable et al. | WO | WO 99/50057 | 10/1999 |
| 2005/0218697 | A1 | 10/2005 | Barz et al. | WO | WO 00/13958 | 3/2000 |
| 2005/0230165 | A1 | 10/2005 | Thomas et al. | WO | WO 00/37302 | 6/2000 |
| 2005/0241756 | A1 | 11/2005 | Harthcock et al. | WO | WO 00/40815 | 7/2000 |
| 2005/0251988 | A1 | 11/2005 | Mendiboure | WO | WO 00/43254 | 7/2000 |
| 2005/0260399 | A1 | 11/2005 | Finerman | WO | WO 00/46461 | 8/2000 |
| 2005/0268454 | A1 | 12/2005 | White | WO | WO 00/55444 | 9/2000 |
| 2005/0269840 | A1 | 12/2005 | Finerman et al. | WO | WO 01/54936 | 8/2001 |
| 2005/0276970 | A1 | 12/2005 | Busseuil et al. | WO | WO 01/71225 | 9/2001 |
| 2005/0285292 | A1 | 12/2005 | Mendiboure et al. | WO | WO 01/83206 | 11/2001 |
| 2006/0000186 | A1 | 1/2006 | Carlson et al. | WO | WO 01/88033 | 11/2001 |
| 2006/0006695 | A1 | 1/2006 | Lutz et al. | WO | WO 03/042024 | 5/2003 |
| 2006/0008615 | A1 | 1/2006 | Muteau et al. | WO | WO 03/051676 | 6/2003 |
| 2006/0019595 | A1 | 1/2006 | Lewis et al. | WO | WO 03/093387 A1 | 11/2003 |
| 2006/0020076 | A1 | 1/2006 | Finerman et al. | WO | WO 2005/077634 A2 | 8/2005 |
| 2006/0021697 | A1 | 2/2006 | Riley et al. | WO | WO 2005/105405 | 11/2005 |
| 2006/0043772 | A1 | 3/2006 | Richardson | WO | WO 2005/113689 | 12/2005 |

FOREIGN PATENT DOCUMENTS

| | | |
|---|---|---|
| DE | 19856255 C1 | 3/1998 |
| DE | 19858903 A1 | 12/1998 |
| EP | 0611778 | 1/1994 |
| EP | 0891918 A1 | 1/1999 |
| EP | 0893331 A1 | 1/1999 |
| EP | 0893332 A1 | 1/1999 |
| EP | 1134126 B1 | 3/2001 |
| EP | 1122156 A2 | 8/2001 |
| EP | 1031496 B1 | 12/2001 |
| EP | 0893332 B1 | 3/2002 |

OTHER PUBLICATIONS

Hopton et al., Application of a Structural Reinforcing Material to Improve Vehicle NVH Characteristics.
Lilley et al., Comparison of Preformed acoustic Baffles and Two-Component Polyurethane Foams for Filling Body Cavities.
Lilley et al., A Comparison of NVH Treatments for Vehicle Floorplan Applications.
Lilley et al., Vehicle Acoustic Solutions.
Mansour et al., Optimal Bonding Thickness for Vehicle Stiffness.

* cited by examiner

STRUCTURAL REINFORCEMENT MEMBER AND METHOD OF USE THEREFOR

CLAIM OF BENEFIT OF FILING DATE

The present application is a continuation of application Ser. No. 11/229,375 filed on Sep. 16, 2005, now U.S. Pat. No. 7,374,219, which is a non-provisional of application Ser. No. 60/612,304 filed Sep. 22, 2004 and the present application claims the benefit of the filing dates of both prior applications, the contents of which are hereby incorporated by reference in their entirety.

RELATED APPLICATIONS

This application is a continuation-in-part of U.S. patent application Ser. No. 11/229,375, filed on Sep. 16, 2005, which in turn claims benefit of U.S. provisional application No. 60/612,304, filed Sep. 22, 2004.

FIELD OF THE INVENTION

The present invention relates generally to a structural reinforcement member and its use in reinforcing a structure of an automotive vehicle such as a convertible.

BACKGROUND OF THE INVENTION

For many years the transportation industry has been concerned with designing structural reinforcement members that do not add significantly to the weight of a vehicle. For example, U.S. Pat. Nos. 5,755,486; 4,901,500; and 4,751,249 describe prior art reinforcing devices. However, it can be particularly difficult to provide adequate or desirable reinforcement to certain vehicles while maintaining lower weights for the reinforcement members. As an example, convertible vehicles often require a relatively high degree of reinforcement since their lack of a rigid roof and pillar structure can result in lower strength and/or integrity relative to vehicles that include a rigid roof and pillar structure. Furthermore, it can be difficult to provide a relatively low weight reinforcement member to a convertible where the reinforcement member can provide adequate or desired amounts of structural integrity to the vehicle. The present invention therefore seeks to provide an improved structural reinforcement member and a method for its use in a reinforced structural system of a transportation vehicle.

SUMMARY OF THE INVENTION

Accordingly, there is disclosed reinforcement member and a structurally reinforced transportation vehicle that includes the reinforcement member. The reinforcement member typically includes a carrier member and reinforcement material disposed upon the carrier member. When installed to a vehicle, the reinforcement material is typically adhered to the carrier member and one or more components of the transportation vehicle. While the reinforcement member may be employed to reinforce a variety of transportation vehicles and may alternatively be employed to reinforce other articles of manufacture, the reinforcement member has been found particularly useful for reinforcement of automotive vehicle and particularly convertibles.

BRIEF DESCRIPTION OF THE DRAWINGS

The features and inventive aspects of the present invention will become more apparent upon reading the following detailed description, claims, and drawings, of which the following is a brief description:

DETAILED DESCRIPTION OF THE PREFERRED EMBODIMENT

The present invention is predicated upon a structural reinforcement member and its use in forming a structural reinforcement system within an article of manufacture. The structural reinforcement member has been found to be particularly useful for reinforcing portions of automotive vehicles, however, it is contemplated that the member may be employed in a variety of articles of manufacture such as buildings, furniture, watercraft or the like. The structural reinforcement has been found even more particularly useful for reinforcing structures such as underbodies of convertible. As used herein, the term convertible is intended to mean any vehicle without a roof; any vehicle having a roof that is configured for removal or assembly to the vehicle with mechanical fasteners; or any vehicle having a roof that is adjustable from a position overlaying a passenger compartment of a vehicle to a position not overlaying the passenger compartment, unless otherwise specified.

Typically, a structural reinforcement member according to the present invention will include a carrier member with a reinforcement material disposed thereon. It is also contemplated, however, that the carrier member may be utilized without the reinforcement material. The reinforcement member may or may not be located within a cavity defined by a structure of the automotive vehicle. According to one preferred aspect of the invention, the reinforcement member is located adjacent to or within a cavity defined by one or more components that at least partially define an underbody of an automotive vehicle (e.g., a convertible). According to another preferred aspect of the invention, the reinforcement member typically spans at least partially to substantially entirely laterally across the vehicle particularly relative to a fore-aft axis of the vehicle.

Figure 1:
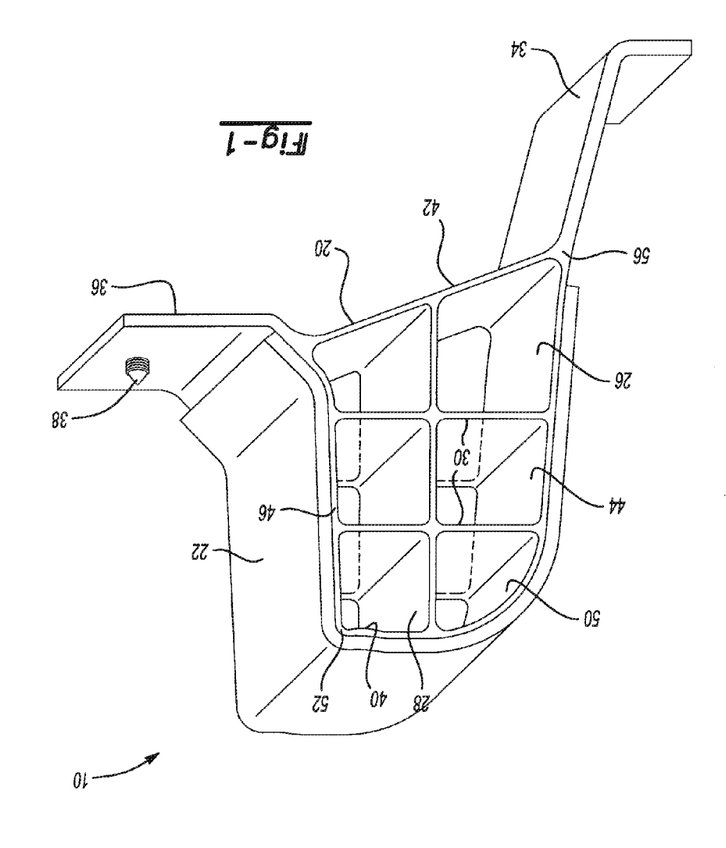
FIG. 1 is a perspective view of a structural reinforcement member according to a preferred aspect of the present invention.
Figure 2:
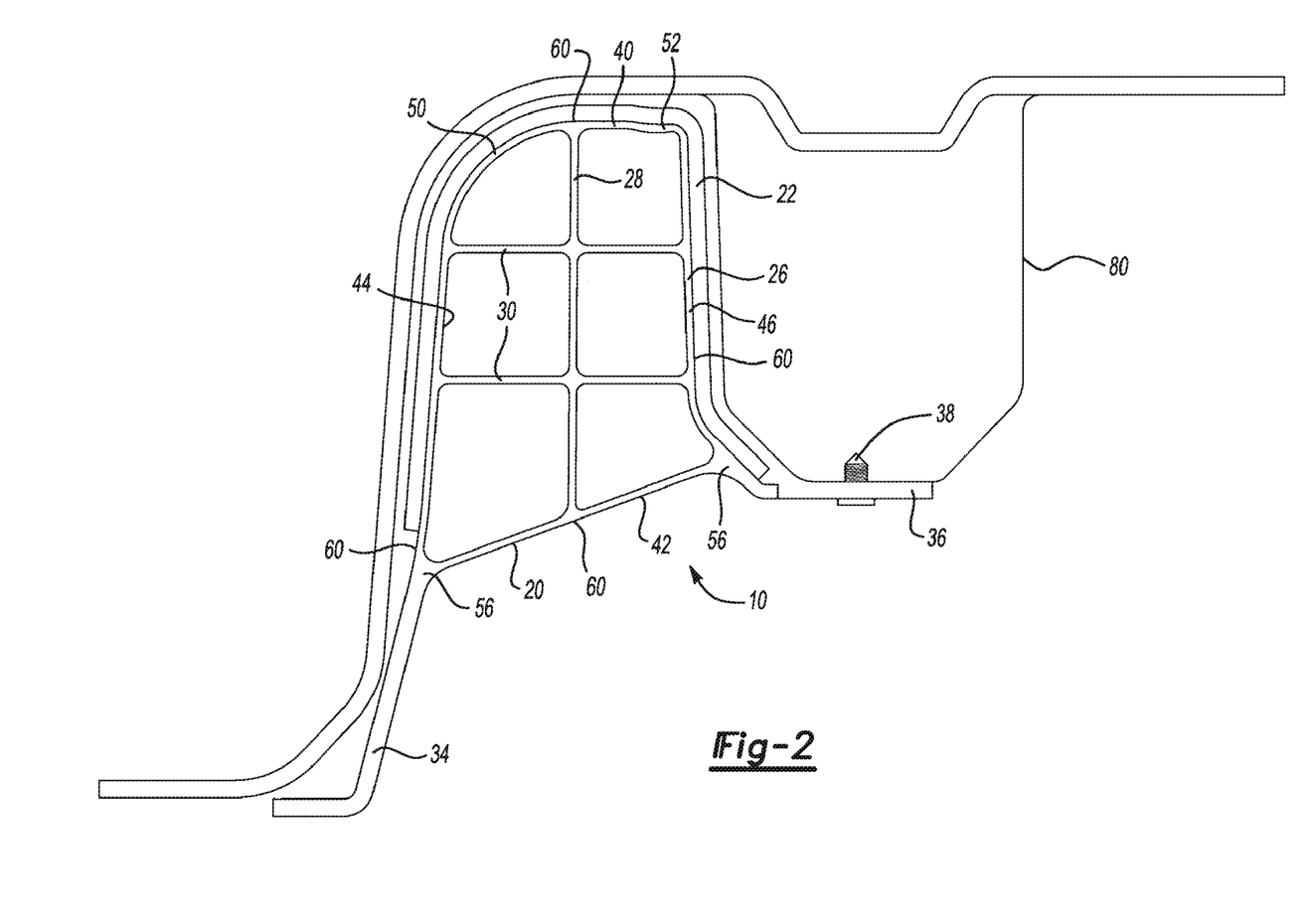
FIG. 2 is front view of the structural reinforcement member of FIG. 1 within a cavity of a structure of an automotive vehicle.

FIGS. 1 and 2 illustrate an example of a structural reinforcement member 10, which is configured for placement within a cavity of an automotive vehicle for forming a reinforced structural system along with one or more components of the vehicle. Preferably, the one or more components of the vehicle at least partially define the cavity. As will be appreciated, the member 10 may be suited for placement in a variety of cavities or in a variety of other locations for reinforcing a variety of components of the automotive vehicle.

The reinforcement member 10 includes a carrier member 20 and one or more masses 22 of reinforcement material disposed upon the carrier member 20. The illustrated carrier member 20 is comprised of an outer peripheral strip 26 and a plurality of ribs 28, 30. The carrier member 20 also includes a first flange 34 and a second flange 36.

In the particular embodiment illustrated, the outer strip 26 includes a first wall, a second wall, a third wall and a fourth wall respectively illustrated as an upper wall 40, a lower wall 42, a first side wall 44 and a second side wall 46. As can be seen, the upper wall 40 is connected to the first side wall 44 by an arcuate portion 50 and the upper wall 40 is connected to the second side wall 46 at a corner 52. Additionally, the lower wall 42 is connected to both of the side walls 44, 46 at respective corners 56.

The illustrated ribs 28, 30 of the carrier member 20 include a pair of transversely extending ribs 30, which both intersect a vertically extending rib 28. As shown, the transverse ribs 30 are substantially perpendicular to the vertical rib 28. In alternative embodiments, however, it is contemplated that there may be multiple ribs or a singular rib extending in a wide variety of directions (e.g., vertically, horizontally, transversely, combinations thereof or the like) and they may be intersecting or non-intersecting and may be skew, perpendicular or parallel. Moreover, the rib or ribs may be straight, curved, contoured or otherwise shaped if such a configuration is desired.

The flanges 34, 36 of the carrier member 20 respectively extend outwardly from adjacent the intersecting corner 56 or interface of the first side wall 44 and the lower wall 42 and from adjacent the intersecting corner 56 or interface of the second side wall 46 and the lower wall 42. Generally, however, the flanges of the carrier member, when included, may extend from other locations of the carrier member if needed or desired.

While the particularities of the carrier member 20 of FIGS. 1 and 2 have been discussed in detail, it is contemplated that the carrier member of the present invention may be provided in different configurations. For example, the carrier member may have a partially or substantially entire tubular outer periphery, optionally with internal intersecting ribs. As another example, the outer periphery of the carrier member may be partially defined by smooth surfaces, contoured (e.g., ribbed) portions or the like.

Typically, the reinforcement material of the present invention is disposed upon outer and/or outwardly facing surfaces of the carrier member. However, it is also contemplated that the reinforcement material may be located internally within cavities or other internal portions of the carrier member. Moreover, there may be one or may be multiple masses of the expandable material disposed within or upon the carrier member.

In the embodiment illustrated, a single continuous mass 22 of the reinforcement material is disposed upon and adhered to outwardly facing surfaces 60 of the first side wall 44, the second side wall 46 and the upper wall 40. It is contemplated, however, that the mass 22 may be divided into multiples masses and may be disposed upon and/or adhered to any combination of the walls 40, 42, 44, 46, the ribs 28, 30 and the flanges 34, 36.

The carrier member or at least portions thereof could be formed of polymeric material materials (e.g., injection molded nylon, injection molded plastic, extruded polymeric materials, combinations thereof or the like), or molded, extruded or otherwise-shaped metal (such as aluminum, magnesium, steel and titanium, an alloy derived from the metals, and even a metallic foam). The carrier member may also be formed of a molding compound such as a sheet molding compound (SMC), a bulk molding compound (BMC), a thick molding compound (TMC) or the like. The formation of carrier members from molding compound is discussed in U.S. patent application Ser. No. 10/712,069, filed Nov. 13, 2003, which is incorporated herein by reference for all purposes.

The reinforcement material may be formed of several different materials. Generally speaking, the present invention may utilize technology and processes for forming and applying the reinforcement material such as those disclosed in U.S. Pat. Nos. 4,922,596, 4,978,562, 5,124,186, and 5,884,960 and commonly owned, co-pending U.S. application Ser. No. 09/502,686 filed Feb. 11, 2000 and 09/524,961 filed Mar. 14, 2000, all of which are expressly incorporated by reference for all purposes. Preferably, the reinforcement material is formed of a high compressive strength and stiffness heat activated reinforcement material having foamable characteristics. The material may be generally dry to the touch or tacky and can be placed upon a carrier member or the like in any form of desired pattern, placement, or thickness, but is preferably of substantially uniform thickness. One exemplary reinforcement material is L-5218 structural foam available through L&L Products, Inc. of Romeo, Mich.

Though other heat-activated materials are possible for the reinforcement material, a preferred heat activated material is an expandable polymer or plastic, and preferably one that is foamable with adhesive characteristics. A particularly preferred material is an epoxy-based structural foam. For example, and without limitation, the structural foam may be an epoxy-based material, including an ethylene copolymer or terpolymer that may possess an alpha-olefin. As a copolymer or terpolymer, the polymer is composed of two or three different monomers, i.e., small molecules with high chemical reactivity that are capable of linking up with similar molecules.

A number of epoxy-based structural reinforcing or sealing foams are known in the art and may also be used to produce the structural foam. A typical structural foam includes a polymeric base material, such as an epoxy resin or ethylene-based polymer which, when compounded with appropriate ingredients (typically a blowing and curing agent), expands and cures in a reliable and predictable manner upon the application of heat or the occurrence of a particular ambient condition. From a chemical standpoint for a thermally-activated material, the structural foam is usually initially processed as a flowable thermoplastic material before curing. It will cross-link upon curing, which makes the material incapable of further flow (e.g, become thermoset).

An example of a preferred structural foam formulation is an epoxy-based material that is commercially available from L&L Products of Romeo, Mich., under the designations L5206, L5207, L5208, L-5248, L5218. One advantage of the preferred structural foam materials over prior art materials is that the preferred materials can be processed in several ways. The preferred materials can be processed by injection molding, extrusion compression molding or with a mini-applicator. This enables the formation and creation of part designs that exceed the capability of most prior art materials. In one preferred embodiment, the structural foam (in its uncured state) generally is dry or relatively free of tack to the touch and can easily be attached to the carrier member through fastening means which are well known in the art.

While the preferred materials for fabricating the reinforcement material have been disclosed, the reinforcement material can be formed of other materials provided that the material selected is heat-activated or otherwise activated by an ambient condition (e.g. moisture, pressure, time or the like) and cures in a predictable and reliable manner under appropriate conditions for the selected application. One such material is the epoxy based resin disclosed in U.S. Pat. No. 6,131,897, the teachings of which are incorporated herein by reference, filed with the United States Patent and Trademark Office on Mar. 8, 1999 by the assignee of this application. Some other possible materials include, but are not limited to, polyolefin materials, copolymers and terpolymers with at least one monomer type an alpha-olefin, phenol/formaldehyde materials, phenoxy materials, and polyurethane materials with high glass transition temperatures. See also, U.S. Pat. Nos. 5,766,719; 5,755,486; 5,575,526; and 5,932,680, (incorporated by reference). In general, the desired characteristics of the reinforcement material 30 include relatively high stiffness, high strength, high glass transition temperature (typically greater than 70 degrees Celsius), and adhesion durability properties. In this manner, the material does not generally interfere with the materials systems employed by automobile manufacturers. Exemplary materials include materials sold under product designation L5207, L-5248 and L5208, which are commercially available from L & L Products, Romeo, Mich.

In applications where the reinforcement material is a heat activated, thermally expanding material, an important consideration involved with the selection and formulation of the material comprising the structural foam is the temperature at which a material reaction or expansion, and possibly curing, will take place. For instance, in most applications, it is undesirable for the material to be reactive at room temperature or otherwise at the ambient temperature in a production line environment. More typically, the structural foam becomes reactive at higher processing temperatures, such as those encountered in an automobile assembly plant, when the foam is processed along with the automobile components at elevated temperatures or at higher applied energy levels, e.g., during paint or e-coat curing or baking steps. While temperatures encountered in an automobile assembly operation may be in the range of about 148.89° C. to 204.44° C. (about 300° F. to 400° F.), body and paint shop applications are commonly about 93.33° C. (about 200° F.) or slightly higher. If needed, blowing agent activators can be incorporated into the composition to cause expansion at different temperatures outside the above ranges.

Generally, suitable expandable foams have a range of expansion ranging from approximately 0 to 300 to over 1000 percent relative to their original non-expanded sizes. The level of expansion of the reinforcement material may be increased to as high as 1500 percent or more. Typically, strength and stiffness are obtained from products that possess lower expansion characteristics.

Some other possible materials for the reinforcement material include, but are not limited to, polyolefin materials, copolymers and terpolymers with at least one monomer type an alpha-olefin, phenol/formaldehyde materials, phenoxy materials, and polyurethane. See also, U.S. Pat. Nos. 5,266,133; 5,766,719; 5,755,486; 5,575,526; 5,932,680; and WO 00/27920 (PCT/US 99/24795) (all of which are expressly incorporated by reference). In general, the desired characteristics of the resulting material include relatively low glass transition point, and good adhesion durability properties. In this manner, the material does not generally interfere with the materials systems employed by automobile manufacturers. Moreover, it will withstand the processing conditions typically encountered in the manufacture of a vehicle, such as the e-coat priming, cleaning and degreasing and other coating processes, as well as the painting operations encountered in final vehicle assembly.

In another embodiment, the reinforcement material is provided in an encapsulated or partially encapsulated form, which may comprise a pellet, which includes an expandable foamable material, encapsulated or partially encapsulated in an adhesive shell. An example of one such system is disclosed in commonly owned, co-pending U.S. application Ser. No. 09/524,298 ("Expandable Pre-Formed Plug"), hereby incorporated by reference.

In addition, as discussed previously, preformed patterns may also be employed such as those made by extruding a sheet (having a flat or contoured surface) and then die cutting it according to a predetermined configuration in accordance with the chosen pillar structure, door beam, carrier member or the like, and applying it to thereto.

It is contemplated that the material of the reinforcement material could be delivered and placed into contact with the assembly members, through a variety of delivery systems which include, but are not limited to, a mechanical snap fit assembly, extrusion techniques commonly known in the art as well as a mini-applicator technique as in accordance with the teachings of commonly owned U.S. Pat. No. 5,358,397 ("Apparatus For Extruding Flowable Materials"), hereby expressly incorporated by reference. In this non-limiting embodiment, the material or medium is at least partially coated with an active polymer having damping characteristics or other heat activated polymer, (e.g., a formable hot melt adhesive based polymer or an expandable structural foam, examples of which include olefinic polymers, vinyl polymers, thermoplastic rubber-containing polymers, epoxies, urethanes or the like) wherein the foamable or reinforcement material can be snap-fit onto the chosen surface or substrate; placed into beads or pellets for placement along the chosen substrate or member by means of extrusion or injection molding; placed along the substrate through the use of baffle technology; a die-cast application according to teachings that are well known in the art; pumpable application systems which could include the use of a baffle and bladder system; and sprayable applications.

In still another embodiment, it is contemplated that the reinforcement material may be applied to the carrier member while the carrier member is at an elevated temperature. As such the reinforcement material will adhere to the carrier member as described in U.S. Provisional Patent Application Ser. No. 60/443,108, already incorporated by reference.

Generally, the reinforcement member is applied to a structure of a transportation vehicle and particularly to an automotive vehicle for forming a reinforced structural system. During formation of the reinforced structural system, the reinforcing structural member can be placed within a cavity of or adjacent to a structure of an automotive vehicle and the structure may be defined by one or more components of the automotive vehicle.

Typically, the reinforcement member is placed adjacent to an underbody of an automotive vehicle and even more typically within a cavity or adjacent one or more components that comprise the underbody of a convertible. The reinforcement member may be designed to span laterally at least partially or substantially entirely across the underbody of the vehicle. The reinforcement member may also be designed to span at least partially or substantially entirely longitudinally along the underbody of the vehicle.

Figures 3, 4:
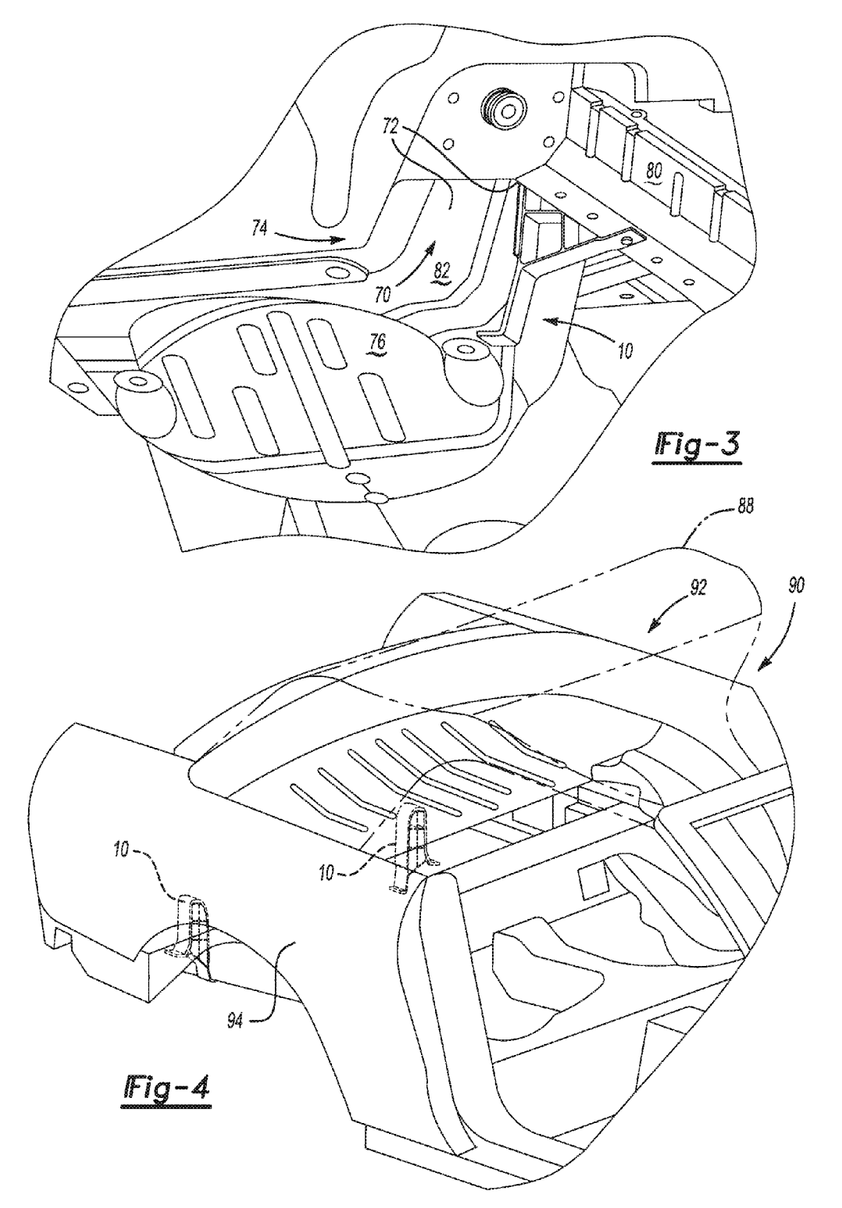
FIG. 3 is a perspective view of the underbody of a vehicle with the structural reinforcement applied thereto.
FIG. 4 is a perspective view of a convertible vehicle with the structural reinforcement applied thereto.

In the exemplary embodiment shown in FIG. 3, the member 10 is placed within a cavity 70 defined by walls 72 of a structure 74 formed by one or more components of the underbody 76 of a convertible. In the particular embodiment illustrated, the components include a frame rail 80 and a trunk compartment 82 (e.g., a spare wheel compartment) of the automotive vehicle. It is contemplated, however, that the reinforcement member 10 may be placed adjacent to or within a cavity of various components of a vehicle underbody such as underbody shields or guards or other.

It should be noted that various fasteners or adhesive may be used to at least temporarily hold the reinforcement member in place until the reinforcement material is activated. For example, one or both of the flanges 34, 36 or other portions of the carrier member 20 may include one or more mechanical fasteners or adhesives for holding the reinforcement member 10 in place.

As shown in FIG. 4, the reinforcement member 10 may be configured for placement with two locations adjacent the underbody 76 of the vehicle 90 (e.g., convertible). In the embodiment shown, each of the members 10 is located within cavities of the vehicle as described above, however, one of the members 10 is located adjacent a first side 92 of the vehicle 90 while the other member 10 is located adjacent a second side 94 of the vehicle 90 that is opposite the first side 92.

After desired placement of the reinforcement member, the reinforcement material is activated (e.g., expanded using heat experienced during an e-coat process or other painting operation typically encountered in the production of automotive vehicles), such that the reinforcement material, expands, contacts and adheres to the walls or surfaces of the components adjacent the materials.

In the particular embodiment illustrated, the reinforcement member 10 is typically located adjacent the underbody 76 within the cavity 70 after the e-coat process, but prior to vehicle painting (e.g., in the paint shop) such that the reinforcement material activates in the paint drying oven.

Once the reinforcement material is substantially fully expanded and cured, the reinforcement member reinforces the components and/or other members (e.g., frame members, trunk compartment rails, body members or panels, pillars or the like) of the vehicle thereby forming a reinforced system. Advantageously, when used for a convertible, the reinforcement member can provide strength and integrity that might have otherwise been provided by a rigid roof and pillar assembly of a non-convertible vehicle. In particular, the reinforcement member or members can provide the overall vehicle and particularly convertibles with greater overall torsional rigidity and can reduce noise, vibration and harshness (NVH) for the vehicles. The reinforcement member(s) may also assist in adjusting (e.g., raising) the natural frequency of the body of the vehicle thereby limiting or adjusting the amount of vibration transmitted by the vehicle, although not required. Further, the reinforcement may assist in limiting the amount of motion of components (e.g., the frame rail and spare wheel well) toward and away from each other, although also not required.

It should be noted that whatever materials are selected for the carrier member and reinforcement material, they should be able to withstand conditions for the particular location at which they will be installed. For example, the reinforcement member 10 of FIGS. 3-4 can be located relatively close to the muffler of an automotive vehicle and, thus, it can be desirable for the materials for the carrier member and the reinforcement member to have relatively high glass transition temperatures due to potential high temperature exposure caused by the muffler.

Unless stated otherwise, dimensions and geometries of the various structures depicted herein are not intended to be restrictive of the invention, and other dimensions or geometries are possible. Plural structural components can be provided by a single integrated structure. Alternatively, a single integrated structure might be divided into separate plural components. In addition, while a feature of the present invention may have been described in the context of only one of the illustrated embodiments, such feature may be combined with one or more other features of other embodiments, for any given application. It will also be appreciated from the above that the fabrication of the unique structures herein and the operation thereof also constitute methods in accordance with the present invention.

The preferred embodiment of the present invention has been disclosed. A person of ordinary skill in the art would realize however, that certain modifications would come within the teachings of this invention. Therefore, the following claims should be studied to determine the true scope and content of the invention.

What is claimed is:

1. A structural reinforcement system, comprising:
   (a) a structure defined by one or more components that includes a fore/aft axis; and
   (b) a reinforcement member having a generally constant profile along its length and including:
      i) a first side wall that terminates at a first outwardly projecting flange at a first end of the first side wall;
      ii) a second side wall that extends beyond the first side wall and terminates at a second outwardly projecting flange at a first end of the second side wall;
      iii) an arcuate wall that connects the first side wall and the second side wall at a second end of each of the first side wall and second side wall;
      iv) a vertical rib between the first and second side walls that spans between at least two bridging walls, the vertical rib and the bridging walls defining a plurality of open cells;
      v) a foamable heat-activated reinforcement material disposed upon the first side wall and second side wall;
      wherein the first and second flanges project outwardly in generally opposite directions.

2. The structural reinforcement system of claim 1, wherein the reinforcement material is not disposed upon the first or second flanges.

3. The structural reinforcement system of claim 1, wherein the first and second flanges are substantially parallel.

4. The structural reinforcement system of claim 1, wherein the bridging walls and the vertical rib are generally orthogonal to one another.

5. The structural reinforcement system of claim 3, wherein the bridging walls and the vertical rib are generally orthogonal to one another.

6. The structural reinforcement system of claim 1, wherein the reinforcement material is disposed upon the outwardly facing surfaces of the reinforcement member and within any internal cavities of the reinforcement member.

7. The structural reinforcement system of claim 5, wherein the reinforcement material is disposed upon the outwardly facing surfaces of the reinforcement member and within any internal cavities of the reinforcement member.

8. The structural reinforcement system of claim 1, wherein at least one of the first or second flanges includes a fastener.

9. The structural reinforcement system of claim 7, wherein at least one of the first or second flanges includes a fastener.

10. The structural reinforcement system of claim 1, wherein the reinforcement member spans at least partially adjacent the underbody of an automotive vehicle in a lateral direction relative to the vehicle.

11. The structural reinforcement system of claim 1, wherein the system includes sheet metal of an automobile having a fore/aft axis and the axis of the open cells is generally aligned in the same direction as the fore/aft axis.

12. The structural reinforcement system of claim 1, wherein the reinforcement material is a thermoset foam material and the reinforcement member is formed of a thermoplastic material.

13. A structural reinforcement system, comprising:
(a) a structure defined by one or more components that includes a fore/aft axis; and
(b) a reinforcement member having a generally constant profile along its length and including:
  i) a first side wall that terminates at a first outwardly projecting flange at a first end of the first side wall;
  ii) a second side wall that extends beyond the first side wall and terminates at a second outwardly projecting flange at a first end of the second side wall, wherein the second flange includes a fastener;
  iii) an arcuate wall that connects the first side wall and the second side wall at a second end of each of the first side wall and second side wall;
  iv) a vertical rib between the first and second side walls that spans between at least two bridging walls, the vertical rib and the bridging walls defining a plurality of open cells, wherein the bridging walls and vertical rib are generally orthogonal to one another;
  v) a foamable heat-activated reinforcement material disposed upon the first side wall and second side wall, wherein the reinforcement material is a heat activated epoxy-based structural foam;
  wherein the first and second flanges project outwardly in generally opposite directions, are substantially parallel.

14. The structural reinforcement system of claim 13, wherein the reinforcement material is not disposed upon the first or second flanges.

15. The structural reinforcement system of claim 13, wherein the reinforcement material is a thermoset foam material and the reinforcement member is formed of a thermoplastic material.

16. The structural reinforcement system of claim 13, wherein the system includes sheet metal of an automobile having a fore/aft axis and the axis of the open cells is generally aligned in the same direction as the fore/aft axis.

17. The structural reinforcement system of claim 5, wherein the system includes sheet metal of an automobile having a fore/aft axis and the axis of the open cells is generally aligned in the same direction as the fore/aft axis.

18. The structural reinforcement system of claim 13, wherein the reinforcement member is located adjacent a vehicle underbody after the e-coat process, but prior to vehicle painting such that the reinforcement material activates in the paint drying oven.

19. The structural reinforcement system of claim 16, wherein the reinforcement member is located adjacent a vehicle underbody after the e-coat process, but prior to vehicle painting such that the reinforcement material activates in the paint drying oven.

20. A structural reinforcement system, comprising:
(a) an automotive vehicle having a structure defined by one or more components that at least partially define an underbody of the vehicle wherein the vehicle includes a fore/aft axis; and
(b) a reinforcement member that spans at least partially adjacent the underbody of the automotive vehicle in a lateral direction relative to the vehicle and includes:
  i) a first side wall that terminates at a first outwardly projecting flange at a first end of the first side wall;
  ii) a second side wall that extends beyond the first side wall and terminates at a second outwardly projecting flange at a first end of the second side wall, wherein the second flange includes a fastener;
  iii) an arcuate wall that connects the first side wall and the second side wall at a second end of each of the first side wall and second side wall;
  iv) a vertical rib between the first and second side walls that spans between at least two bridging walls, the vertical rib and the bridging walls defining a plurality of open cells, wherein the bridging walls and vertical rib are generally orthogonal to one another;
  v) a foamable heat-activated reinforcement material disposed upon the first side wall and second side wall but not on the first or second flange, wherein the reinforcement material is a heat activated epoxy-based structural foam;
  vi) sheet metal of an automobile, wherein the axis of the open cells is generally aligned in the same direction as the fore/aft axis;
  wherein the first and second flanges project outwardly in generally opposite directions, are substantially parallel and wherein the reinforcement member is located adjacent a vehicle underbody after the e-coat process, but prior to vehicle painting such that the reinforcement material activates in the paint drying oven.

* * * * *

UNITED STATES PATENT AND TRADEMARK OFFICE
CERTIFICATE OF CORRECTION

| | | |
|---|---|---|
| PATENT NO. | : 7,695,040 B2 | Page 1 of 1 |
| APPLICATION NO. | : 12/040383 | |
| DATED | : April 13, 2010 | |
| INVENTOR(S) | : Eric Brennecke | |

It is certified that error appears in the above-identified patent and that said Letters Patent is hereby corrected as shown below:

Page 2, U.S. Patent Documents, Column 1, "6,321,793 B1" should read --6,321,796 B1--.

Column 9, line 42, "reinforcement system of claim 5" should read --reinforcement system of claim 15--.

Signed and Sealed this

Eighth Day of June, 2010

David J. Kappos
*Director of the United States Patent and Trademark Office*